Figure 1:
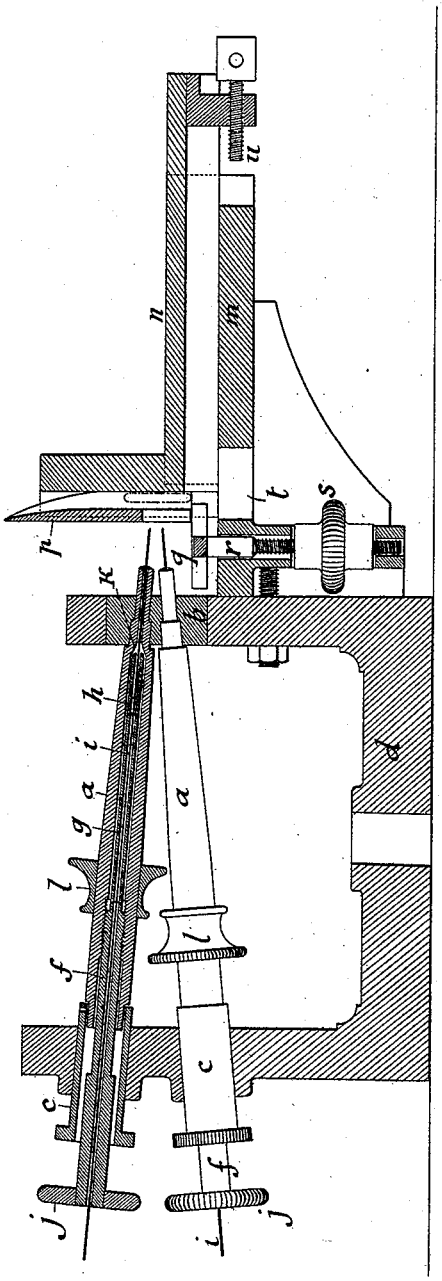

(No Model.) 2 Sheets—Sheet 1.

J. CLÉRET.
MACHINE FOR PIERCING PEARL BUTTONS.

No. 450,056. Patented Apr. 7, 1891.

Witnesses:
R. C. Hogue,
A. C. Hamacher

Inventor
Jules Cléret
by Pollard Mauro
his attorneys.

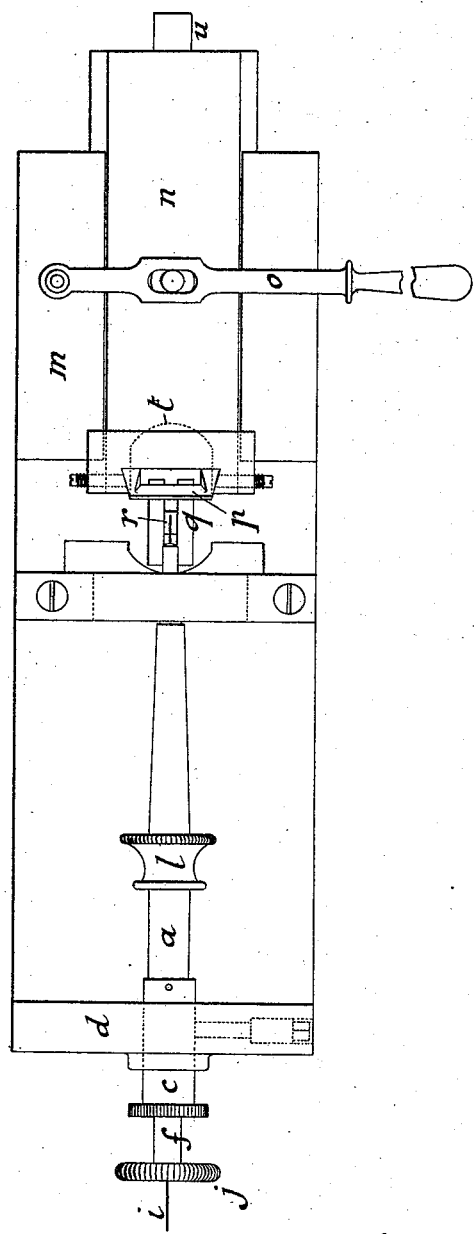

UNITED STATES PATENT OFFICE.

JULES CLÉRET, OF BEAUVAIS, FRANCE.

MACHINE FOR PIERCING PEARL BUTTONS.

SPECIFICATION forming part of Letters Patent No. 450,056, dated April 7, 1891.

Application filed October 27, 1890. Serial No. 369,487. (No model.)

*To all whom it may concern:*

Be it known that I, JULES CLÉRET, of Beauvais, in the Republic of France, have invented a new and useful Improvement in Machines for Piercing Pearl Buttons and Similar Articles, which improvement is fully set forth in the following specification.

The present invention has reference to mechanism for piercing or perforating pearl buttons or other articles similar in form, the invention being particularly applicable for the manufacture of buttons having two or four holes. The drills are preferably arranged in pairs with their points so disposed as to pierce two holes simultaneously at points diametrically opposite to each other, which arrangement is found to be very efficient and advantageous. The button or other article is presented to the action of the drills by means of a chariot sliding longitudinally in the frame. It carries a button-holder which is removably supported thereon, this piece being made according to the dimensions of the button-blank. A platform carried by the frame supports the button during the drilling operation, this platform being vertically adjustable and placed adjacent to a discharge-opening in the frame, through which the button drops into a suitable receptacle when the chariot is withdrawn.

In the accompanying drawings, Figure 1 is a vertical longitudinal section, partly in elevation, and Fig. 2 a plan view, of a machine or apparatus constructed in accordance with the invention.

The tool-holders are composed of a tapering sleeve $a$, whose forward ends are shouldered to rotate in a journal-box $b$, the other ends being supported in cylindrical journals $c$. Within each sleeve $a$ is a hollow spindle composed of three parts $f$, $g$, and $h$, surrounding the drill-rod $i$. Part $f$ projects from the journal $c$ and carries a milled-edge button $j$. Its inner end is threaded to engage with the internal threads of sleeve $a$. The other parts $g$ and $h$ of the spindle are held in sleeve $a$ by slight friction. The bore of sleeve $a$ is conically contracted at its forward end $k$, and part $h$ of the spindle is split for the greater part of its length. Consequently when part $f$ is screwed home the hold of part $h$ upon the spindle is tightened by the pressure of the contracted part of $k$ of the sleeve, against which the end of part $h$ abuts. This arrangement permits the ready removal and insertion of the drills. Each tool-holder has its pulley $l$, and a belt or cord passing over them all drives the tool-holders at a uniform speed.

To the frame $d$ is fixed a table $m$, upon which slides the chariot $n$, which in the machine shown is adapted to be actuated by a hand-lever $o$. The chariot carries in a recess in the face opposite the drills a button-blank holder $p$, adapted to the diameter and thickness of the button and removable for insertion of a different holder when required.

In action the button rests upon the platform $q$, composed of two parallel bars united by a cross-piece $r$, the ends of these bars entering a space under the sliding chariot $n$. It is adjustable vertically by means of a nut-and-screw arrangement $s$, as shown in the drawings, so as to present the central portion to the action of the drills. The platform is adjacent to an opening $t$ in the frame through which the button drops, when the chariot $n$ is withdrawn, into a suitable receptacle.

An adjustable screw $u$ limits the motion of the chariot toward the drill, arresting it at the proper point, according to the thickness of the button.

The invention, while it specially includes the arrangement of drills to operate in pairs at diametrically-opposite points on the button, is not limited to a single pair, as shown, but would include the use of two pairs operating alternately, and preferably from opposite sides.

I claim—

1. The combination, with the button-holding device, of the drill-holder comprising a journaled sleeve provided with a pulley for turning and being internally contracted at its forward end, a hollow spindle in several parts, the forward part being split and abutting against the contracted portion of the sleeve, so that when forced forward it will clamp the drill, and the rear part projecting beyond the sleeve and being provided with a button for turning and with threads engaging threads on said rotatory sleeve, whereby the spindle, drill, and sleeve are coupled together for action, substantially as described.

2. The combination, with the drills, of the frame having a discharge-opening, the chariot adapted to slide on said frame, the button-holder carried by said chariot across said opening, and the vertically-adjustable platform beneath said holder, substantially as described.

In testimony whereof I have signed this specification in the presence of two subscribing witnesses.

JULES CLÉRET.

Witnesses:
WM. FOUIN,
ROBT. M. HOOPER.